(12) United States Patent
Hermey et al.

(10) Patent No.: US 9,287,694 B2
(45) Date of Patent: Mar. 15, 2016

(54) LINE GUIDING SYSTEM

(75) Inventors: Andreas Hermey, Hennef (DE); Robb Duff, Ruppichteroth (DE); Frank Schlögel, Köln (DE)

(73) Assignee: Igus GmbH, Cologne (DE)

( * ) Notice: Subject to any disclaimer, the term of this patent is extended or adjusted under 35 U.S.C. 154(b) by 82 days.

(21) Appl. No.: 14/232,414

(22) PCT Filed: Jul. 6, 2012

(86) PCT No.: PCT/EP2012/063245
§ 371 (c)(1),
(2), (4) Date: Jan. 13, 2014

(87) PCT Pub. No.: WO2013/007631
PCT Pub. Date: Jan. 17, 2013

(65) Prior Publication Data
US 2014/0166420 A1 Jun. 19, 2014

(30) Foreign Application Priority Data
Jul. 11, 2011 (DE) ............... 20 2011 103 263 U (51) Int. Cl.
H02G 11/02 (2006.01)
H02G 11/00 (2006.01)

(52) U.S. Cl.
CPC ............... *H02G 11/00* (2013.01); *H02G 11/02* (2013.01)

(58) Field of Classification Search
CPC ...... H02G 11/00; H02G 11/02; H02G 11/006
USPC .......... 191/12 R, 12.2 R, 12.4, 12 C
See application file for complete search history.

(56) References Cited

U.S. PATENT DOCUMENTS

| 4,712,972 A | * | 12/1987 | Nakashima et al. | ............ 174/69 |
| 5,694,813 A | | 12/1997 | McLaughlan | |
| 8,387,763 B2 | * | 3/2013 | Burke et al. | ............. 191/12.2 R |

FOREIGN PATENT DOCUMENTS

| DE | 7732412 U1 | 2/1982 |
| DE | 4005594 A1 | 8/1991 |

(Continued)

OTHER PUBLICATIONS

German Search Report issued Apr. 4, 2014, received in corresponding, priority Application No. 20 2011 103 263.2, 5 pgs.

(Continued)

*Primary Examiner* — R. J. McCarry, Jr.
(74) *Attorney, Agent, or Firm* — Grossman Tucker Perreault & Pfleger, PLLC (57) ABSTRACT

The invention relates to a line guiding system (1) for accommodating and guiding supply lines between two connection points (2.1, 2.2) that can be moved relative to one another in a circular motion with respect to a rotational axis (d) over a rotational angle range, wherein the line guiding system (1) has an elongated strand (3.1, 3.2, 3.3) coupled to the connection points (2.1, 2.2), on or in which strand the supply lines can be arranged in a guided manner, and the strand (3.1, 3.2, 3.3) can be moved back and forth within the rotational angle range while guided over a circular arc, such as to form a first run (4.1), a second run (4.2), and a deflecting bend (5) that connects the first run (4.1) and the second run (4.2). In order to enable guidance of the supply lines over an increased rotational angle range, at least two strands, a first strand (3.1) and a second strand (3.2), are provided, which are arranged such as to be coupled one behind the other.

20 Claims, 9 Drawing Sheets

(56) References Cited

FOREIGN PATENT DOCUMENTS

| | | | |
|---|---|---|---|
| DE | 102007038567 A1 | 2/2009 | |
| EP | 0460667 A2 | 12/1991 | |
| EP | 0552688 B2 | 9/2002 | |
| JP | S55119670 A | 9/1980 | |
| JP | H0585672 A | 4/1993 | |
| JP | 2009044809 * | 2/2009 | ............... B25J 19/00 |
| JP | 2009044809 A | 2/2009 | |

OTHER PUBLICATIONS

English language PCT International Search Report mailed Jul. 5, 2013, received in corresponding PCT Application No. PCT/EP2012/063245, 2 pgs.

English language translation of PCT International Preliminary Report on Patentability/Written Opinion issued Jan. 14, 2014, received in corresponding PCT Application No. PCT/EP2012/063245, 7 pgs.

* cited by examiner

LINE GUIDING SYSTEM

The invention concerns a line guide system for receiving and guiding supply lines between two connection points which are movable relative to each other in a circular movement with respect to a rotary axis over a rotary angle range, wherein the line guide system has an elongate strand which is coupled to the connection points and at or in which the supply lines can be arranged in guided relationship, and the strand is reciprocatingly displaceable guidedly over a circular arc within the rotary angle range, forming a first run, a second run and a deflection arc connecting the first and second runs together.

A problem with such line guide systems is a rotary angle range which is frequently too small. That can admittedly be enlarged in the case of more recent line guide systems by means of a strand with a rearward bending radius, that is to say with a possible bending of the strand in two directions, up to 600°. That however can still be too small in the use of certain machines like wind power installations and floating cranes. To enlarge the rotary angle range it would be possible for electric lines to be transferred by way of contact rings and sliding contacts, but in that case known transmission problems, for example as a consequence of lack of electric contact or the effect of moisture, can occur, which under some circumstances can even require complicated and expensive encapsulation of the contact rings and sliding contacts.

The object of the invention is to provide a line guide system of the general kind set forth, which permits guidance of the supply lines over an increased rotary angle range and which is of a simple structure.

According to the invention that object is attained by the features of claim 1. Advantageous developments are described in the appendant claims. The specified object is already attained in that there are provided at least two strands, a first strand and a second strand, which are arranged coupled one behind the other.

By virtue of the strands being coupled one behind the other or in serial relationship the individual rotary angle ranges of the strands are added to afford an overall rotary angle range so that it can be increased for example when using a rearward bending radius in relation to the respective strands to up to 1200° in comparison with the known line guide systems. A plurality of strands can also be coupled together 'in series', that is to say one behind the other, in cascade-like relationship one behind the other or in serial relationship so that the individual rotary angle ranges thereof are added together in respect of the rotary angle ranges to give a total rotary angle range. In a direction of succession from the first strand towards the second strand the first strand can be connected at the front to the one movable connection point and the second strand in the direction of succession can be connected at the rear to the other movable connection point. The supply lines can be arranged guided in the strands in the direction of succession. The supply lines to be guided in the strands can thus be introduced into the first strand at one of the relatively mutually movable connection points, guided in the first strand to the end thereof, there transferred to the second strand and guided to the end thereof. At that other end the other of the relatively mutually movable connection points can be disposed. For that purpose the strand ends at which the transition from the first strand to the second strand takes place can be arranged in stationary relationship with each other.

The deflection arc of the individual strands can have a bending axis parallel to the rotary axis. The strands can be arranged displaceably in the same direction by way of their respective deflection arcs, relative to the rotary axis. The deflection arcs of the strands can thus be arranged opened in the same peripheral direction or in the same direction of rotation, with respect to the rotary axis. The radii of curvature of the deflection arcs can involve the same peripheral direction with respect to the rotary axis.

The strands can be arranged spaced relative to each other axially or radially with respect to the rotary axis. As described in greater detail hereinafter it is also possible to provide a plurality of serially coupled strands which are arranged spaced relative to each other axially and/or radially with respect to the rotary axis. In that way the line guide system can even have a multiplicity of strands of which two or more are spaced from each other radially with respect to the rotary axis and are connected in series with a group of further strands which are spaced axially from them and which in turn are coupled one behind the other. Thus any combinations of serially arranged strands are conceivable, which are arranged spaced relative to each other axially and/or radially relative to the rotary axis individually or in groups.

The connection points of the strands, in relation to the direction of succession, can be in the form of a front connection point and a rear connection point. For serially coupling the strands the rear connection point of the first strand can be arranged stationarily relative to the front connection point of the second strand. The supply lines to be guided in the strands can thus be introduced into the front strand at the front connection point thereof, guided in the first strand to the rear connection point thereof, there transferred to the second strand in the front connection point thereof and guided to the rear connection of the second strand. At the rear connection point of the second strand the supply lines can be arranged to be passed out of same. Then the supply lines can be introduced into a third strand at the front connection point thereof, the third strand serially adjoining the second strand. The rear connection point of the first strand can directly engage the front connection point of the second strand. In particular because of the configuration of the deflection arc of the respective strand however it is structurally advantageous if the two connection points are arranged in mutually spaced and stationary relationship.

To guide the strands the line guide system can have a guide system having three guide units which are rotationally movable relative to each other with respect to the rotary axis. Those guide units can be identified as the front guide unit, the central guide unit and the rear guide unit, relative to the direction of succession. In this case the front connection point of the first strand can be fixed to the front guide unit, the rear connection point of the first strand and the front connection point of the second strand can be fixed to the central guide unit and the rear connection point of the second strand can be fixed to the rear guide unit. In that way the first strand can be displaced by way of a rotary movement of the front guide unit relative to the central guide unit and the second strand can be displaced by way of a rotary movement of the central guide unit relative to the rear guide unit, over their respective rotary angle range, in such a way that the respective rotary angle ranges are added together. The guide units can be of rotationally symmetrical configuration relative to the rotary axis.

Preferably the front guide unit is arranged stationarily with respect to a base. In that way the central guide unit and the rear guide unit can be arranged rotationally movably with respect to the base. For that purpose mounting of the central and rear guide units with axially and/or radially operative bearing elements is advantageous, in which case the bearing arrangement can be in the form of a plain bearing arrangement or preferably in the form of a rolling bearing arrangement.

To guide the runs on a respective circular arc the guide units can be of a circular ring-like configuration having a respective circular peripheral contact surface and a circular radial contact surface for an associated run and for mounting the contact point associated with that run. The surface normal of the peripheral contact surface can face radially relative to the rotary axis and the surface normal of the radial contact surface can face in the direction of the rotary axis. The geometry involved provides that the peripheral contact surface is curved in the form of a circular arc or is of a shape in the form of a circular-cylindrical peripheral surface, while the radial contact surface is of the same shape as the end face of a hollow cylinder. With a usual arrangement of the line guide system with a rotary axis arranged at least approximately perpendicularly the radial contact surface can serve for supporting the respectively associated run while the run bears against the peripheral contact surface which is curved in the form of a circle, assuming the shape of a circular arc. In that way the respective run is also arranged against the contact surfaces upon displacement in a rest position without relative movement with respect to the contact surfaces so that there cannot be any detrimental friction between runs and contact surfaces. Upon displacement it is only in the region of the deflection arc that there is a relative movement, giving rise to frictional forces, of the strand with the associated contact surfaces.

The contact surfaces provided for the two runs of a strand can be arranged coaxially relative to each other and radially spaced relative to each other. In that case the peripheral contact surfaces for the two runs of the strand face radially towards each other while the radial contact surfaces are desirably arranged in a radial plane so that there is no axial difference in height to be overcome by the strand upon displacement thereof. Preferably the two peripheral contact surfaces adjoin each other by way of an annular gap. That ensures that the guide units do not come into peripheral contact with each other and thus cannot at least partially lose their relative rotational mobility.

The peripheral and radial contact surfaces provided for the two runs of a strand can thus define a guide channel for that strand so that the strand can be moved in a protected condition in that guide channel. As the guide channel is defined by the two contact surfaces which are curved in a circular configuration the strand can involve the above-described rearward bending radius for contact of both strands against the respectively associated contact surface. Cover elements can be provided for covering the guide channel or channels.

The radial contact surface and peripheral contact surface of a guide unit can be fixed to each other, forming an L-shaped profile. In the case described in greater detail hereinafter involving the arrangement of the guide units in a common plane the contact surfaces of the central guide unit, with the other two guide units, can form a respective guide passage disposed in that plane. For that purpose the central guide unit can have a T-shaped profile with a stem bar having the peripheral contact surfaces and a transverse bar forming the radial contact surfaces.

Preferably the connection point of a run is respectively fixed to the radial contact surface associated with that run.

In regard to an arrangement of the strands, which is spaced radially relative to the rotary axis, the guide units can be arranged in a first plane perpendicularly to the rotary axis. In that way the guide units can be arranged coaxially relative to each other in the first plane. For that purpose the front guide unit can be fixed in position on the base. In addition the rear guide unit can be arranged radially outwardly and the front guide unit radially inwardly. Particularly for the above-described case where the front guide unit is fixed in position to the base it is advantageous for that stationary front guide unit to be arranged radially outwardly and for the rotationally movable rear guide unit to be arranged protectedly radially inwardly. In both case the central guide unit can be arranged in a protected condition radially between the other guide units.

Alternatively or additionally the guide units can be arranged in two axially spaced planes perpendicularly to the rotary axis. In that case the front guide unit can be arranged in a first plane and the rear guide unit can be arranged in a second plane spaced relative to the first plane. The central guide unit can be arranged in bridging relationship of the axial spacing of the planes in both planes. For that purpose the first connection point of the first strand can be arranged in the first plane and the front connection point of the second strand can be arranged in the second plane, fixed to the central guide unit. In that way the front guide unit and the central guide unit in the first plane can form the guide channel for the first strand and the central guide unit with the rear guide unit in the second plane can form the guide channel for the second strand. The supply lines to be guided can be arranged for example in a guide tube fixed in position to bridge over the axial spacing between the second connection point of the first strand and the first connection point of the second strand, on the central guide unit. In a reversal of that arrangement the front guide unit and the rear guide unit can be arranged in the first plane and in the second plane respectively radially inwardly while the central guide unit can extend radially outwardly over both planes.

In general that symmetrical structure of the guide units and the arrangement thereof in the line guide system allow the individual guide units to be assembled in a modular arrangement. In that case, when the guide units are arranged in two planes, the front and rear guide units which are arranged one above the other when disposed in two axial spaced planes can be respectively produced in the form of at least approximately identical components. The central guide unit bridging over the two planes can have a division plane perpendicularly to the rotary axis, which divides it into two halves, a lower half and an upper half, wherein those halves can be at least approximately of the same structure. The halves can be connected together non-rotatably for example by way of a push-in or latching-push-in connection.

In the case of the two provided axially spaced planes for the guide units the front guide unit can also be fixed in position on the base. The central guide unit can be mounted to the base and the rear guide unit can preferably be rotatably mounted on the front guide unit. In addition the central guide unit can be mounted preferably rotationally displaceably and in particular slidingly rotationally displaceable on the base in the second plane.

The modular structure can be modified in regard to the arrangement of the guide units in a common plane, such that the individual guide units are in the form of individual modules which can be arranged one beside the other and/or one above the other with respect to the planes. If for example there are three guide units provided respectively in two axially mutually spaced planes, of which guide units for example the front guide unit in the first plane is arranged radially outwardly, then the spacing of the two planes can be bridged over by way of the rear guide unit which here is arranged radially inwardly, insofar as a second rear guide unit is fitted non-rotatably on to that rear guide unit, the second rear guide unit then being arranged in the second plane. The central guide unit in the second plane can be arranged rotationally movably by way of the central guide unit in the first plane. Accordingly the rear guide unit of the second plane can be arranged rotationally movably by way of the rear guide unit in the first plane. Corresponding to the first plane the guide units in the second plane, with the adjacent guide unit, can respectively form a guide channel for a third strand or a fourth strand respectively, wherein the third strand is arranged in the second plane between the rear guide unit and the central guide unit and the fourth strand is arranged in the second plane between the central guide unit and the front guide unit. In that way with an arrangement of four strands, the possible rotary angle range can be quadrupled in relation to the state of the art.

It is apparent that this system can be enlarged by further axially mutually spaced planes with a corresponding increase in the rotary angle range, in which case, in relation to the above-described example having two planes, the axial spacing between the second plane and a third plane can be bridged over by way of the radially outwardly disposed guide unit and the spacing between the third and a fourth plane can be bridged over by way of the radially inwardly disposed guide unit.

In a corresponding fashion in the line guide system, as an increase in the rotary angle range, in respect only of guide units arranged in one plane, a further guide unit can be added radially inwardly or radially outwardly to the above-described three guide units. Whether the further guide unit is to be arranged radially inwardly or outwardly ultimately depends on appropriate considerations: if for example a radially inward guide unit is stationarily connected to the base, then a radially outward guide unit can be added to expand the line guide system.

The rotary angle ranges of the individual strands can be abutment-limited and/or drive-limited. For that purpose for example in the case of an abutment limitation it can be provided that, after the rear guide unit is displaced over the rotary angle range of the second strand, the entrainment member butts against the central guide unit. Thereupon, with further rotation, the central guide unit can be entrained with the rear guide unit until the end of the rotary angle range of the first strand is also reached, which can be delimited by an abutment. Particularly in line guide systems for larger machines, it is advantageous if the individual rotationally movable guide units are driven in motor-controlled or transmission-controlled relationship. Advantageously for uniform displacement of the strands the angular speed at which the rear guide unit is driven can be twice as great as the angular speed at which the central guide unit is driven. Those different angular speeds can be achieved for example by way of a transmission. To delimit the rotary angle range it is possible for example to arrange on the motor a preferably incremental or absolute angle sensor. That angle sensor can be used at the same time to control or regulate the rotation of the guide units. Particularly in the case of structurally small line guide systems for rotary angle range delimitation it can be provided that the strands themselves delimit the rotary angle range insofar as in the extended position they are so clamped that they block any further displacement.

Advantageously a spacer body can be provided at least for one strand, for spacing its runs. For that purpose the spacer body can be arranged preferably with play between the runs and at the inside of the deflection arc. In addition it can be coupled to the movement of the deflection arc upon displacement of the strand. Preferably the spacer body is arranged in rollingly displaceable or preferably slidingly displaceable relationship on the radial contact surfaces for the first and second run of the respective strand. Advantageously the sliding pairing of run/radial contact surfaces and/or spacer body/radial contact surfaces, can be afforded for example by means of ground and/or coated contact surfaces or by means of sliding projections, with reduced sliding friction. The spacer body can be provided at the underside with the sliding projections at which it can be supported against the radial contact surfaces in the installation position.

In a preferred configuration of the line guide system there are provided two first strands and/or two second strands, wherein the first strands and the second strands are respectively arranged in a one plane and displaceably in opposite relationship therein relative to each other. Preferably the first strands and/or the second strands are respectively of the same configuration. In that way the cross-sectional quantity of supply lines is practically doubled without the structural height of the line guide system having to be altered. In that way the deflection arcs of the first strands and the second strands respectively can be arranged at a peripheral spacing relative to each other, which remains at least approximately constant over the rotary angle range. Therefore it is here particularly advantageous to provide for example for the two first strands a spacer body which extends over the entire length of the runs of the first two strands and which bears slidingly displaceably thereagainst in the two deflection arcs of the first strands. In that way it is possible to ensure, over the entire rotary angle range, that the strands bear in the required fashion against the peripheral contact surface respectively associated with them, thus ensuring that the deflection arcs are properly negotiated.

In order not to mechanically load the associated strand the spacer body can be arranged guided in the respective guide channel. For that purpose at the underside it can have a guide projection which preferably extends in the manner of a circular arc over the spacer body and which in the installation position engages into a guide groove provided in the guide channel. Preferably the annular gap between the guide units serves as a guide groove.

The spacer body can be provided in the manner of a circular ring with an opening whose peripheral dimensioning is determined by the spacing of the two deflection arcs. So that the spacer body can be displaced without any susceptibility to disturbance over the rotary angle range between the runs, without for example tilting, it is proposed that the spacer body is provided in the form of a chain with chain link members which respectively form a circular arc portion adapted to the associated one of the associated guide channel, and which are arranged pivotably relative to each other in the line guide system in parallel relationship with the rotary axis. In that arrangement the chain link members can be so disposed pivotably relative to each other that they are pivotable into a form with the above-described rearward bending radius.

The line guide system can have a connection device for installation or connection thereof in or on a machine structure and/or for supporting a construction or superstructure on the machine structure. In that case the structure can preferably be stationarily connected to the rear connection point of the second strand. Preferably the structure is non-rotatably connected to the rear guide unit. For that purpose, it is possible to provide, as part of the connection device, support elements, for example in the form of brackets, for supporting the structure on the line guide system, or connection elements like flanges for fixing the line guide system to the machine structure.

Figure 16:
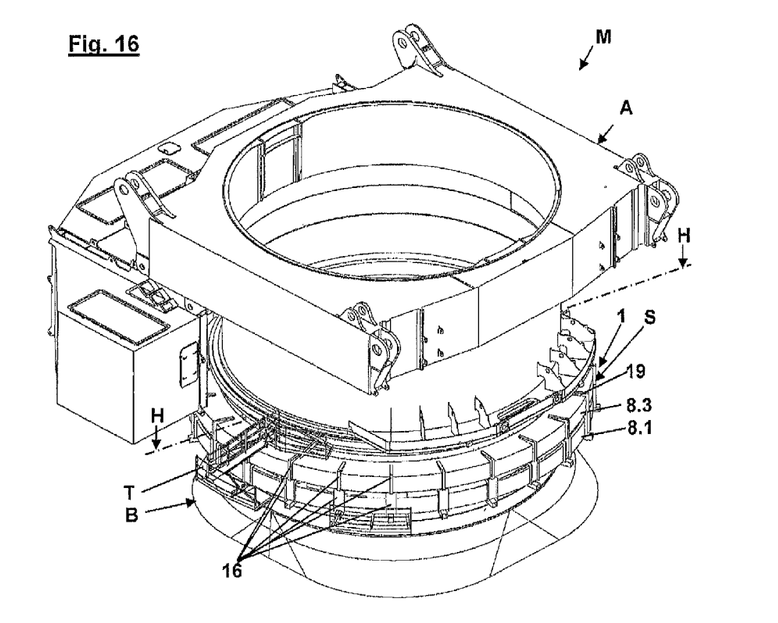
FIG. 16 shows a perspective plan view of a machine installation having a fourth embodiment of the line guide system.
Figure 17:
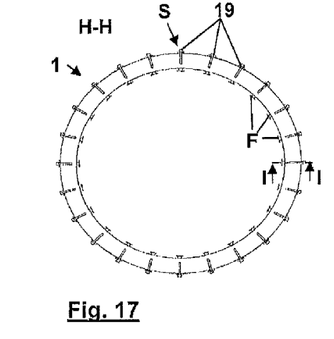
FIG. 17 shows a cross-sectional view along section line H-H in FIG. 16 with a plan view of the line guide system.
Figure 18:
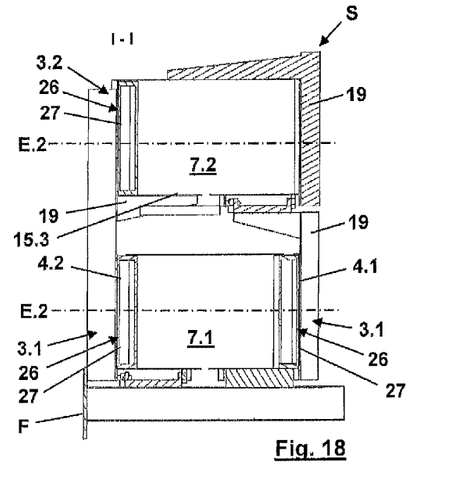
FIG. 18 shows a cross-sectional view along line I-I in FIG. 17.

The present invention is described in greater detail hereinafter by means of a number of embodiments of the line guide system, illustrated in the drawings in which:

FIGS. 1 to 15 show various views and sectional views of three different embodiments of a line guide system 1. A fourth embodiment of the line guide system 1 is shown in FIGS. 16 to 18 in its use in a machine installation M.

The line guide system 1 is designed to receive and guide supply lines (not shown here) between two connection points 2.1, 2.2 which are movable relative to each other in a circular movement with respect to a rotary axis d over a rotary angle range. In each of the embodiments shown here the line guide system 1 has two first strands 3.1 and two second strands 3.2, the first strands 3.1 being arranged in mutually parallel relationship. They are displaceable in opposite relationship with respect to the rotary axis. In the same way the second strands 3.2 are arranged mutually parallel. The first strands 3.1 are however arranged serially or coupled one behind the other with respect to the respectively associated second strand 3.2. The associated strands 3.1, 3.2 are coupled together in a direction of succession a from the first strand 3.1 to the second strand 3.2. A first strand 3.1 'hands over' the supply lines guided therein to the second strand 3.2 associated with it. In that case the serially or successively arranged strands 3.1, 3.2 are arranged displaceably in the same direction relative to each other, with respect to the rotary axis d.

Figure 1:
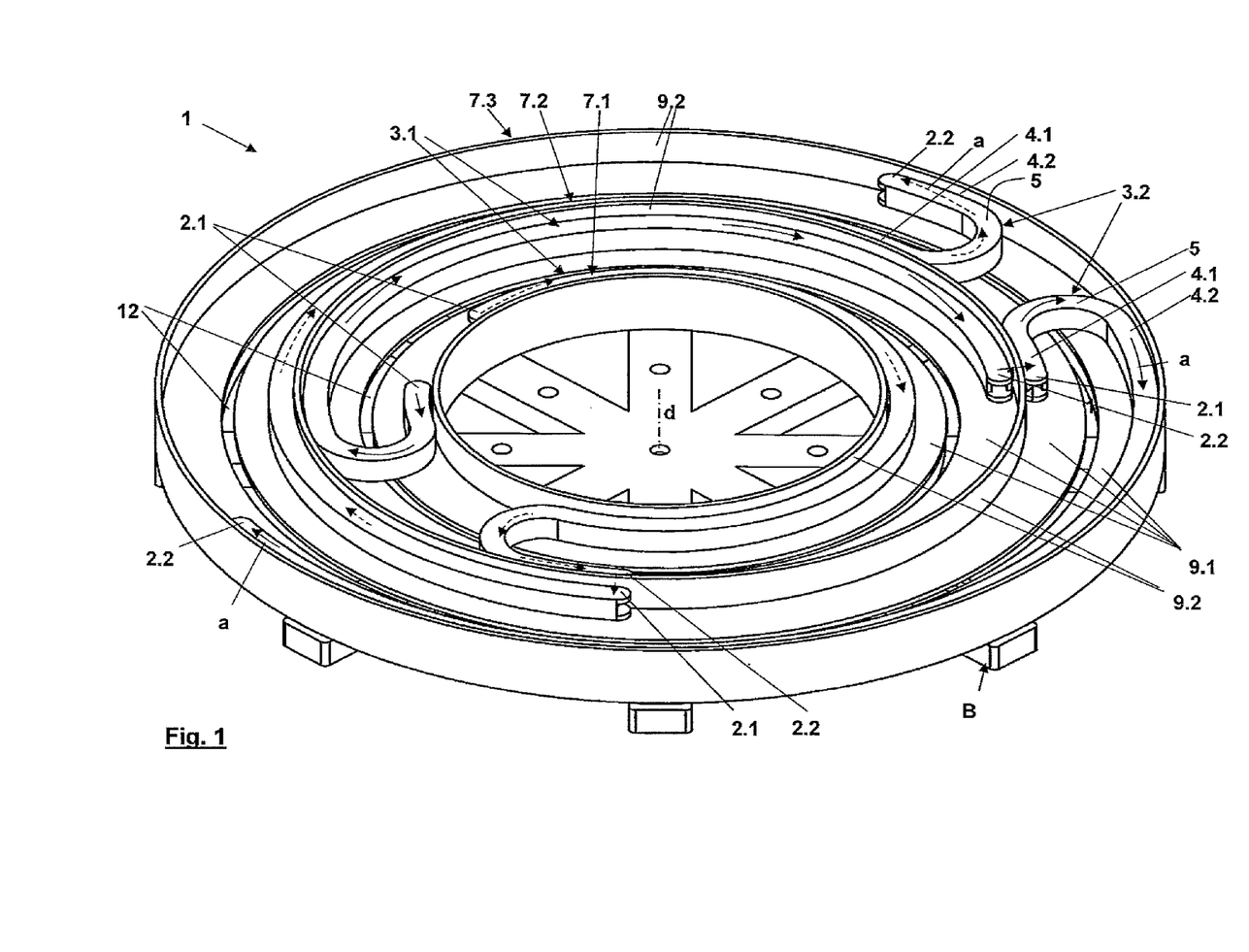
FIG. 1 shows a perspective plan view of a first embodiment of a line guide system.

All strands 3.1 and 3.2 are reciprocatingly displaceable over a circular arc within the rotary angle range, forming a first run 4.1 and a second run 4.2, and forming a deflection arc 5 connecting the first strand 4.1 and the second strand 4.2. The successively arranged strands 3.1, 3.2 are arranged displaceably in the same direction over their respective deflection arcs 5. The deflection arcs of the serially or successively arranged strands 3.1, 3.2 are arranged opened in the same peripheral direction with respect to the rotary axis d. Correspondingly each strand 3.1, 3.2 has two connection points which are here referred to as the front connection point 2.1 and the rear connection points 2.2, relative to the succession direction a. That succession direction a is shown for example by means of small arrows in FIG. 1, showing a perspective plan view of a first embodiment of the line guide system 1. In FIG. 1 and also FIGS. 2-4, 7, 8, 10, 13 and 14, a respective annular cover element which is provided has been removed to permit a view into the configuration of the strands 3.1, 3.2. As here there are two first strands 3.1 and two second strands 3.2 which are coupled in successive relationship combined together to form respective pairs comprising a first strand 3.1 and a second strand 3.2, the succession direction for one of those pairs is shown with a solid arrow while for the other pair it is shown with a broken-line arrow in FIGS. 1 and 2. In addition here, as also in the other Figures, only the essential components are shown, and these are also shown in highly simplified form without structural details, in order to be able to more clearly represent the basic principle of the line guide system 1 according to the invention.

Figure 2:
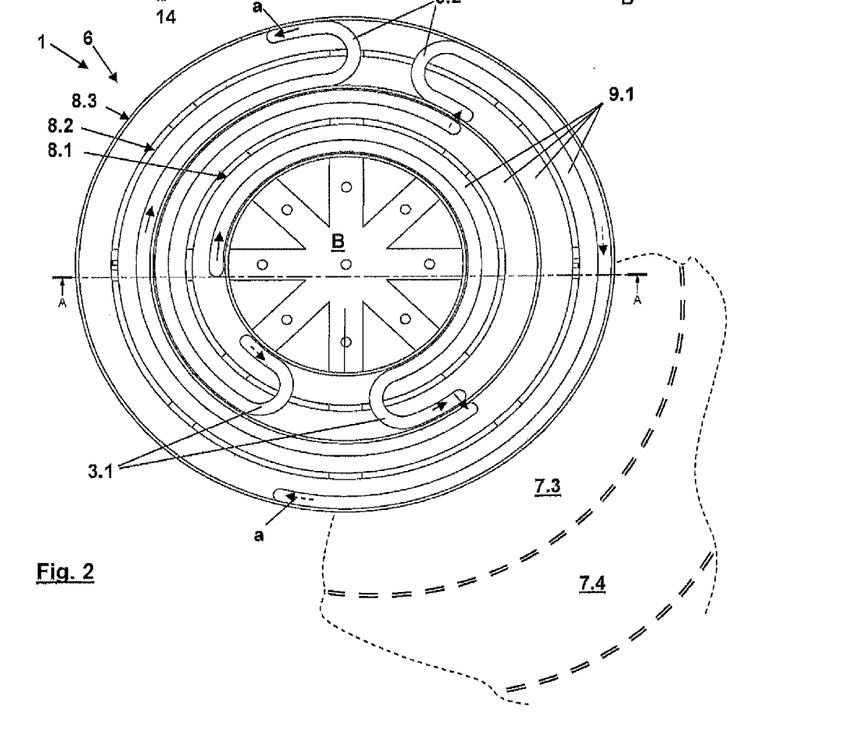
FIG. 2 shows a plan view of the first embodiment of the line guide system of FIG. 1.

As can be directly seen from FIGS. 1 and 2, in the case of two strands 3.1, 3.2 which are coupled together, wherein the first strand 3.1 here is arranged in the succession direction in front of the second strand 3.2, the rear connection point 2.2 of the first strand 3.1 is arranged stationarily relative to the front connection point 2.1 of the second strand 3.2 as here the lines guided in the first strand 3.1 are transferred to the second strand 3.2. As can further be seen from FIGS. 1 and 2 the individual angular ranges of the respectively coupled strands 3.1, 3.2 are added to give an overall angular range so that this is advantageously of a large dimension.

The two runs 4.1, 4.2 of the respective strands 3.1, 3.2 are respectively guided in the form of a circular arc and adapted also to be bent in opposition to the bending direction of the deflection arc 5, whereby it is already possible to achieve a large rotary angle range of about a maximum of 540° to 600°. The provision of the successively coupled strands 3.1, 3.2 means that this rotary angle range can be doubled, but in this case, in the embodiments provided here of the line guide system 1, the rotary angle range is added up to a total of 950°.

The two first strands 3.1 and the two second strands 3.2 are guided in opposite relationship in the line guide system 1. In other words, in relation to the first embodiment of the line guide system 1 as shown in FIG. 1, with regard for example to the first strands 3.1, upon displacement, a first strand 3.1 is displaced with its first run 4.1 being wound up and the other first strand 3.1 is displaced at the same time with its second run 4.2 being unwound. That parallel arrangement of the first strands 3.1 and second strands 3.2 respectively, besides the advantageous doubling of the provided cross-section of the strands 3.1, 3.2, for the purposes of guiding the supply lines, is advantageous in regard to the distribution of force in the line guide system 1, being symmetrical relative to the rotary axis.

The strands 3.1, 3.2 are guided in the form of a circular arc with respect to the rotary axis d by means of a guide system 6. For that purpose the guide system 6 has a first guide channel 7.1 for the first strands 3.1 and a second guide channel 7.2 for the second strands 3.2. The guide channels 7.1, 7.2 are delimited by means of three guide units which are rotationally movable relative to each other with respect to the rotary axis d and which in relation to the succession direction a are referred to as the front guide unit 8.1, the central guide unit 8.2 and the rear guide unit 8.3. The first strands 3.1 are respectively fixed with their front connection point 2.1 to the front guide unit 8.1. The first strands 3.1 are respectively fixed with their rear connection point 2.2 to the central guide unit 8.2 while the second strands 3.2 are respectively fixed with their front connection point 2.1 to the central guide unit 8.2 in peripheral relationship at the same height with respect to the first strands 3.1. Finally the second strands 3.2 are respectively fixed with their rear connection point 2.2 to the rear guide unit 8.3. The front guide unit 8.1 and the rear guide unit 8.3 respectively have two contact surfaces, a radial contact surface 9.1 and a peripheral contact surface 9.2, for the respectively associated runs 4.1, 4.2 of the respectively associated strands 3.1, 3.2. The runs 4.1, 4.2 are laid down against and held to those contact surfaces 9.1, 9.2 so that the runs 4.1, 4.2 do not involve any relative movement with respect to the contact surfaces 9.1, 9.2, thereby avoiding frictional forces.

The contact surfaces 9.1, 9.2 of the front guide unit 8.1 and the rear guide unit 8.3 delimit the first guide channel 7.1 radially outwardly and the second guide channel 7.2 radially inwardly. They are of an L-shaped cross-section (FIGS. 3, 9 and 15) relative to the contact surfaces 9.1, 9.2. The central guide unit 8.2 which in relation to the succession direction a is arranged between the front guide unit 8.1 and the rear guide unit 8.3 delimits both guide channels 7.1, 7.2, in other words, the first guide channel 7.1 is delimited radially inwardly and the second guide channel 7.2 radially outwardly. Accordingly it has two radial contact surfaces 9.1 and two peripheral contact surfaces 9.2, wherein in regard to the contact surfaces 9.1, 9.2 they are of a substantially T-shaped cross-sectional profile with a stem bar 10 having the two peripheral contact surfaces 9.2 and a transverse bar 11 having the two radial contact surfaces 9.1.

The mutually adjacent guide units 8.1, 8.2, 8.3 are respectively separated by way of an annular gap 12. Bridging over that annular gap 12, the deflection arc 5 of each strand 3.1, 3.2 connects the runs 4.1, 4.2 thereof, while the deflection arc 5 is curved about an axis (not shown here) parallel to the rotary axis d. That means that the strands 3.1, 3.2 are respectively only subjected in the region of their deflection arc 5 to frictional forces which arise due to the relative movements of the guide units 8.1, 8.2, 8.3. In the embodiments of the line guide system 1 shown here, the front guide unit 8.1 is respectively non-rotatably connected to a base B.

Figure 3:
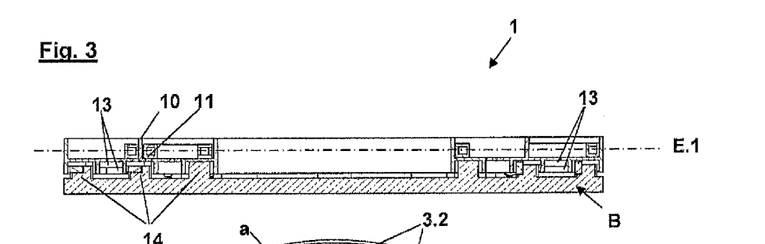
FIG. 3 shows a longitudinal section along section line A-A in FIG. 2.
Figure 4:
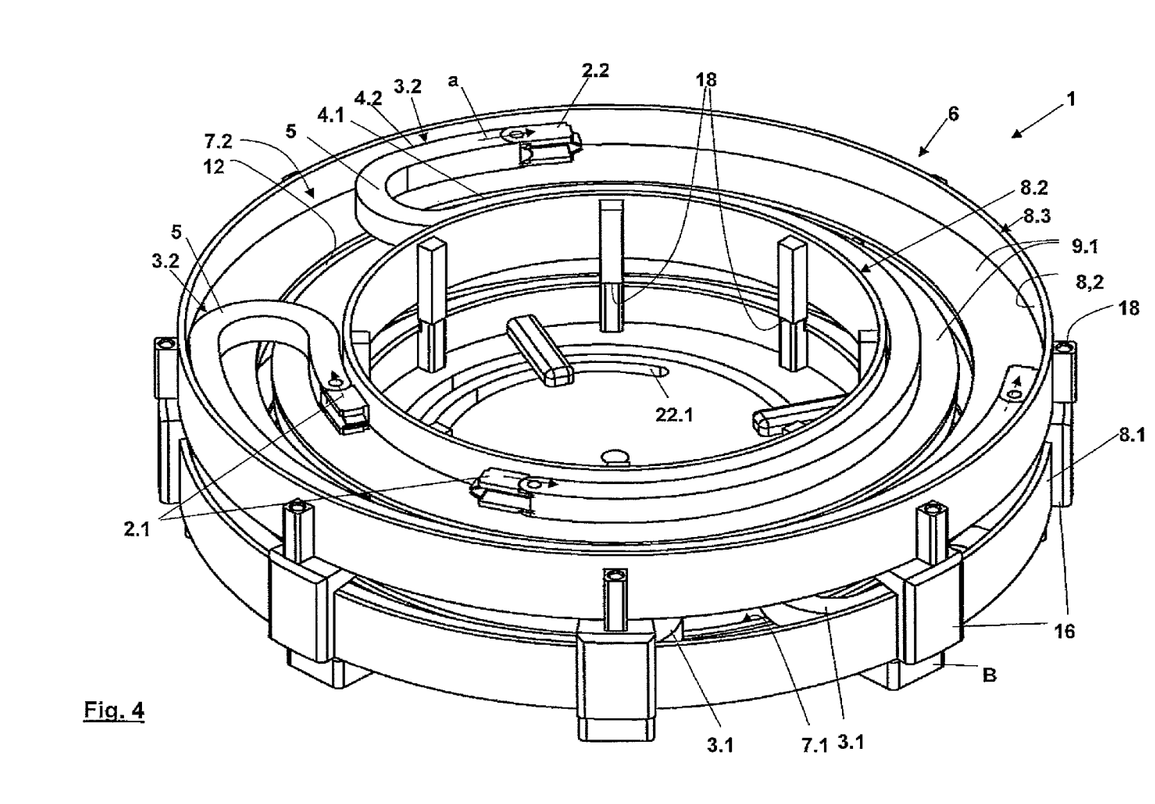
FIG. 4 shows a perspective plan view of a second embodiment of a line guide system.

In the first embodiment of the line guide system 1, in FIGS. 1 to 3, all guide units 8.1, 8.2, 8.3 are arranged in a first plane E.1 perpendicularly to the rotary axis d, that plane E.1 being the plane of the drawing in FIG. 2. In this case the front guide unit 8.1 is arranged radially inwardly, the rear guide unit 8.3 is arranged radially outwardly and the central guide unit 8.2 is arranged between the two, on the base B, wherein the front guide unit 8.1 is non-rotatably connected to the base B while the other two guide units 8.2, 8.3 are mounted rotatably on the base B. FIGS. 1 to 3 do not show a provided cover element which is mounted at the top side on the guide channels 7.1, 7.2 to cover them over. The cover element has brackets 16 on which a structure A shown for example in FIG. 16 can be supported. That structure A is rotated, entraining the rear guide unit 8.3. When the rear guide unit 8.3 reaches the end of its prescribed rotary angle range the central guide unit 8.2 is entrained by way of abutments 13 provided between the rear guide unit 8.3 and the central guide unit 8.2 and operative as entrainment members, with further rotation of the structure A and the rear guide unit 8.3, and rotated relative to the first guide unit 8.1 until the end of the prescribed rotary angle range between the central guide unit 8.2 and the front guide unit 8.1 is reached. Here, instead of the abutments, there is provided a control (not further shown here) which blocks further rotation in that direction. The abutments 13 are arranged on the rear guide unit 8.3 and on the central guide unit 8.2 diametrally with respect to the rotary axis d so that a respective abutment 13 of the rear guide unit 8.3 is associated with an abutment 13 of the central guide unit. Associated abutments 13 are respectively arranged at one height and abutments which are not associated are respectively arranged at different heights relative to each other, so that abutments 13 which are not associated with each other can be passed over in the rotary movement and abutments 13 which are associated with each other can butt against each other. In that way the rotary angle range between the front guide unit 8.1 and the central guide unit 8.2 is limited to about 360°.

The base B here involves a star-shaped structure having three circular rails 14 which are fitted axially relative to the rotary axis d, wherein a guide unit 8.1, 8.2, 8.3 is fitted on each of the circular rails 14. FIG. 3 clearly shows an axial rolling bearing 15.1 and a radial rolling bearing 15.2, by means of which the central guide unit 8.2 and the rear guide unit 8.3 are mounted to the circular rails 14 while the front guide unit 8.1 is fixed in position on the circular rail 14 associated with it.

In the form of broken-line arc segments, FIG. 2 indicates symbolically that the line guide system 1 can be enlarged in modular fashion without complication and expense by further guide channels delimited by additional guide units (not explicitly shown here), here being a third guide channel 7.3 and a fourth guide channel 7.4, wherein at least one respective strand (not shown) is guided in the guide channels 7.3, 7.4.

Figure 9:
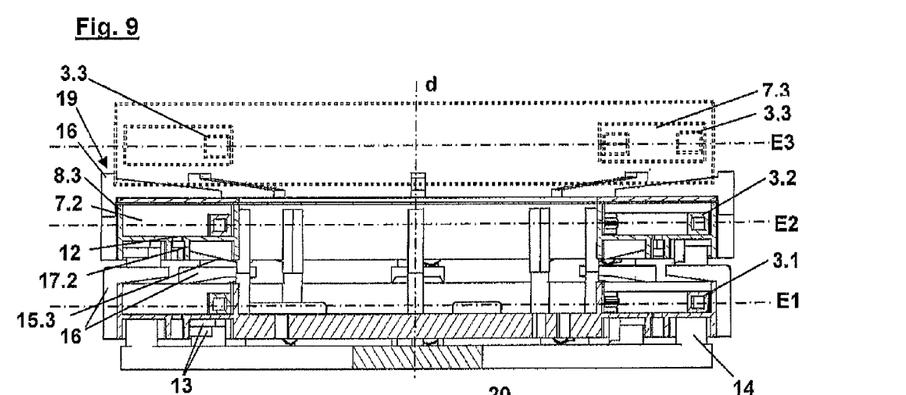
FIG. 9 shows a longitudinal sectional view along the section line D-D in FIG. 8.
Figure 10:
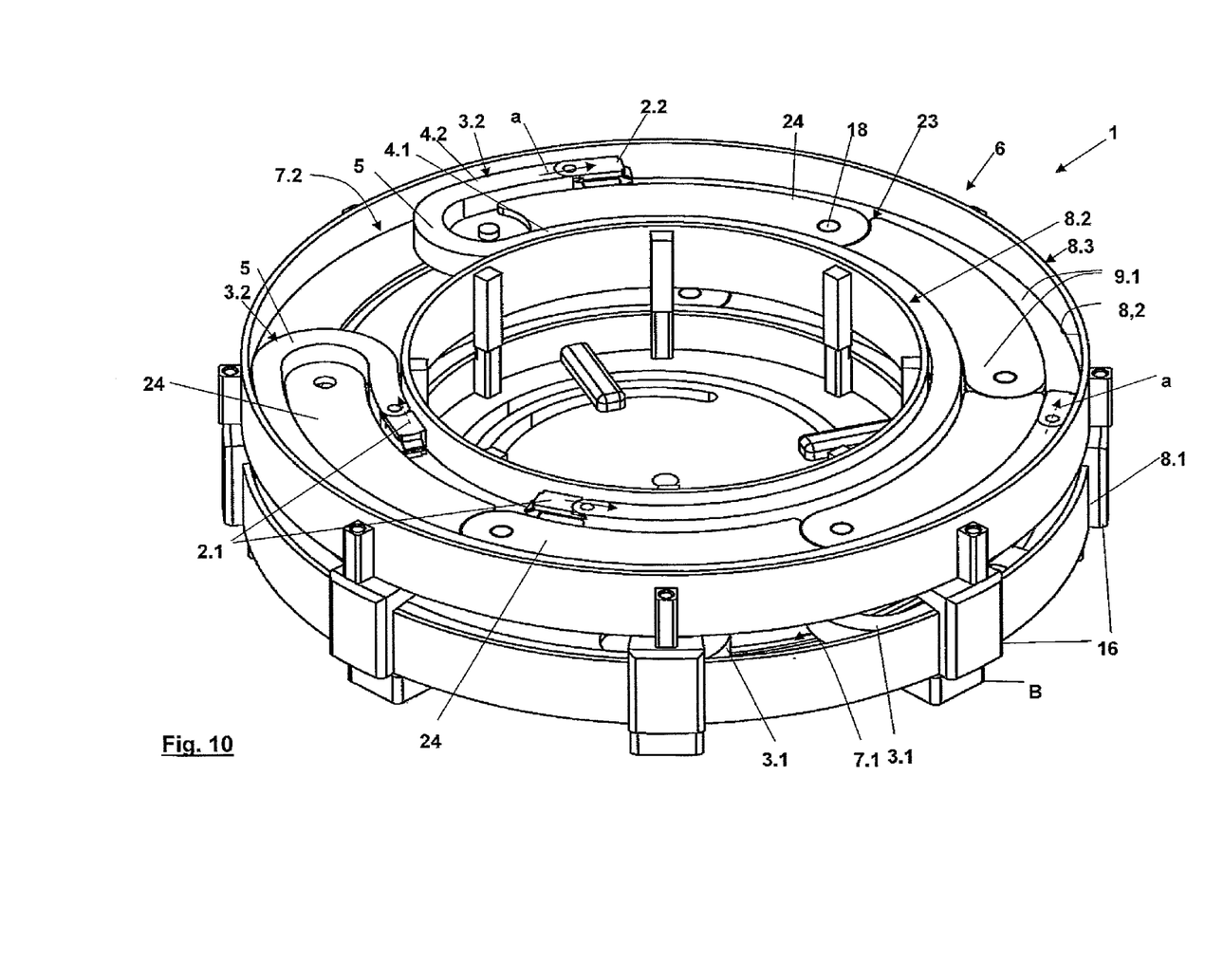
FIG. 10 shows a perspective plan view of a third embodiment of the line guide system.
Figure 11:
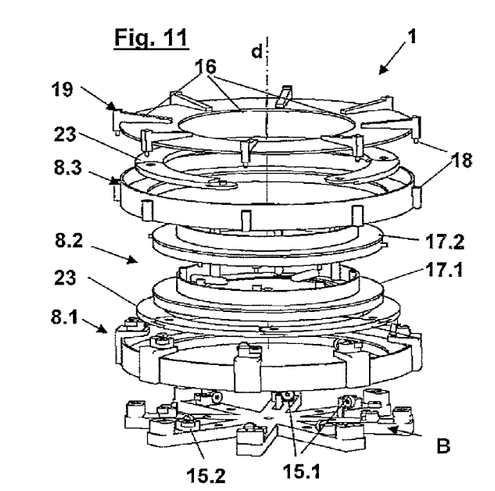
FIG. 11 shows a lateral exploded view of the third embodiment of the line guide system of FIG. 10.
Figure 12:
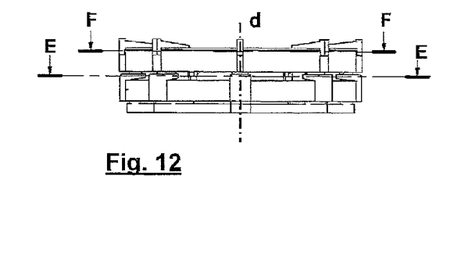
FIG. 12 shows a side view of the third embodiment of the line guide system of FIG. 10 with illustrated cross-sectional lines.
Figure 13:
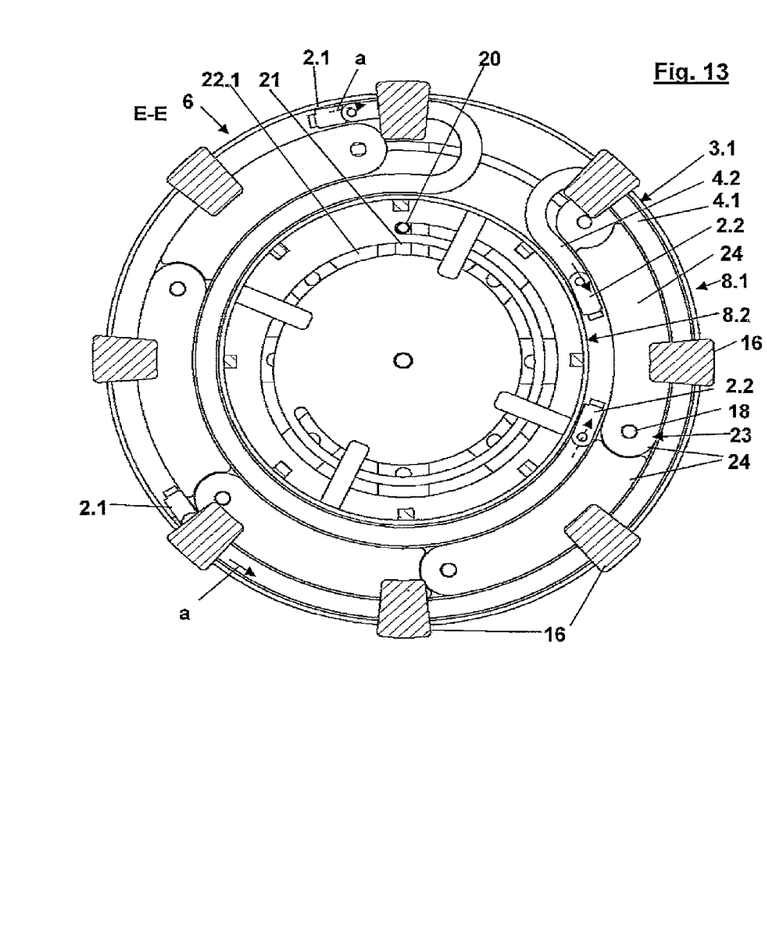
FIG. 13 shows a cross-sectional view along the section line E in FIG. 12.
Figure 14:
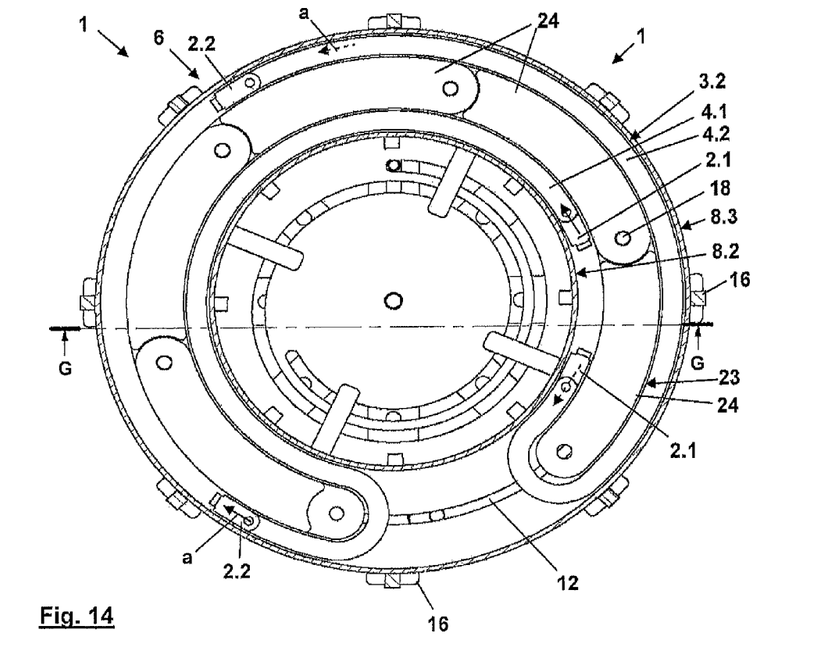
FIG. 14 shows a cross-sectional view along the section line F-F in FIG. 12.
Figure 15:
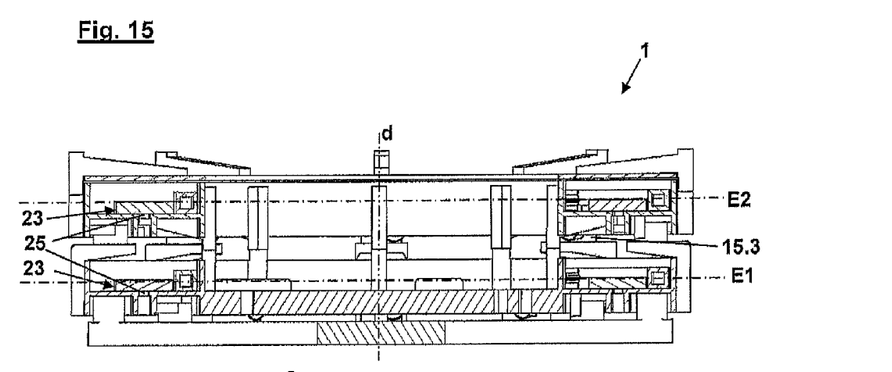
FIG. 15 shows a longitudinal section along section line G-G in FIG. 14.

In the two embodiments of the line guide system 1 shown in FIGS. 4 to 9 and FIGS. 10 to 15 the guide units are arranged in two axially spaced planes, in the first plane E.1 and a second plane E.2, perpendicularly to the rotary axis d (FIGS. 9 and 15). Thus the line guide system 1 has a double-storey structure which can be clearly seen in FIGS. 4 and 10. In this case the front guide unit 8.1 in the first plane E.1 and the rear guide unit 8.3 in the second plane E.2 are respectively arranged radially outwardly. To bridge over the axial spacing between the two planes E.1 and E.2 the central guide unit 8.2 extends over both planes E.1, E.2. In that case the central guide unit 8.2 with the front guide unit 8.1 in the first plane E.1 defines the first guide channel 7.1 for the two first strands 3.1 while the central guide unit 8.2 with the rear guide unit 8.3 in the second plane E.2 defines the second guide channel 7.2 for the two second strands 3.2. Accordingly the rear connection points 2.2 of the first strands 3.1 in the first plane E.1 are fixed to the contact surfaces 9.1, 9.2 of the central guide unit 8.2 while the front connection points 2.1 of the second strands 3.2 in the second plane E.2 are fixed to the contact surfaces 9.1, 9.2, provided there, of the central guide unit 8.2. As the connection points 2.1, 2.2 are respectively fixed stationarily relative to each other to the central guide unit 8.2, the supply lines (not shown here) can be fixedly axially laid in bridging relationship over the axial spacing between the two planes E.1, E.2 on the central guide unit 8.2.

Figure 5:
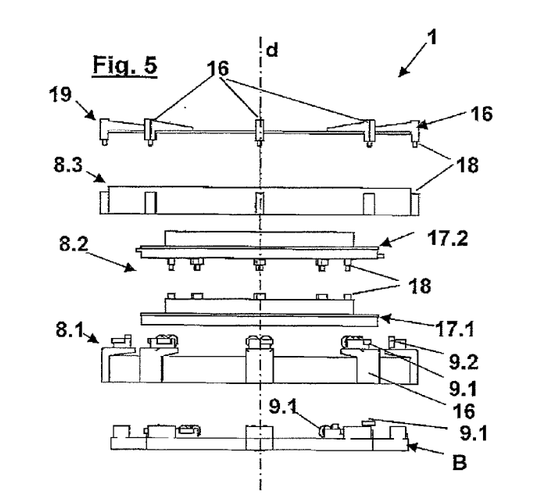
FIG. 5 shows a lateral exploded view of the second embodiment of the line guide system of FIG. 4.
Figure 6:
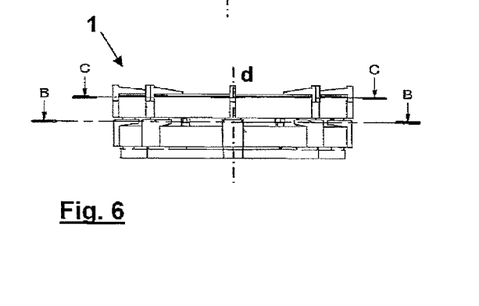
FIG. 6 shows a side view of the second embodiment of the line guide system of FIG. 5 with illustrated cross-sectional lines.
Figure 7:
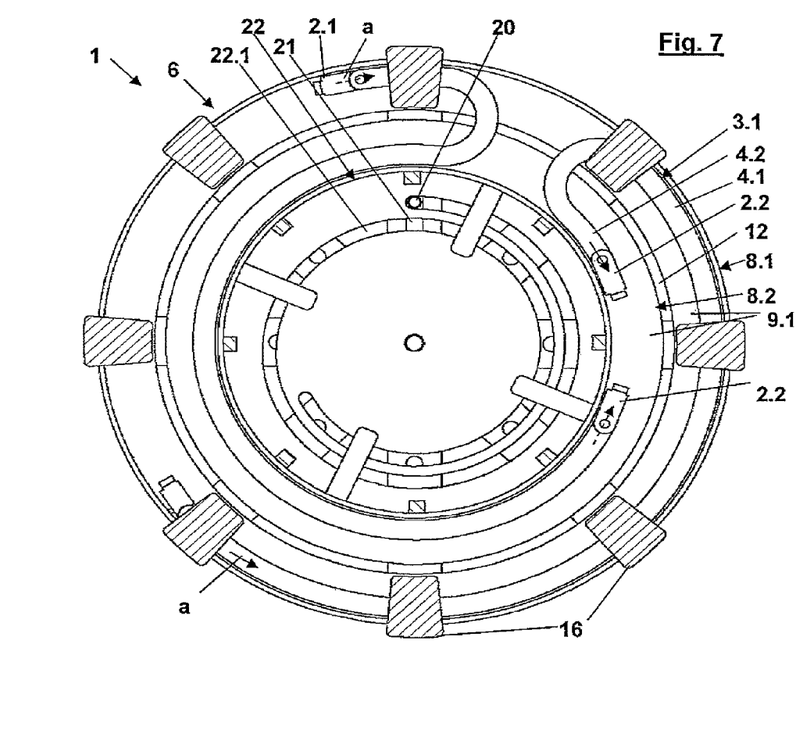
FIG. 7 shows a cross-sectional view along the section line B-B in FIG. 6.
Figure 8:
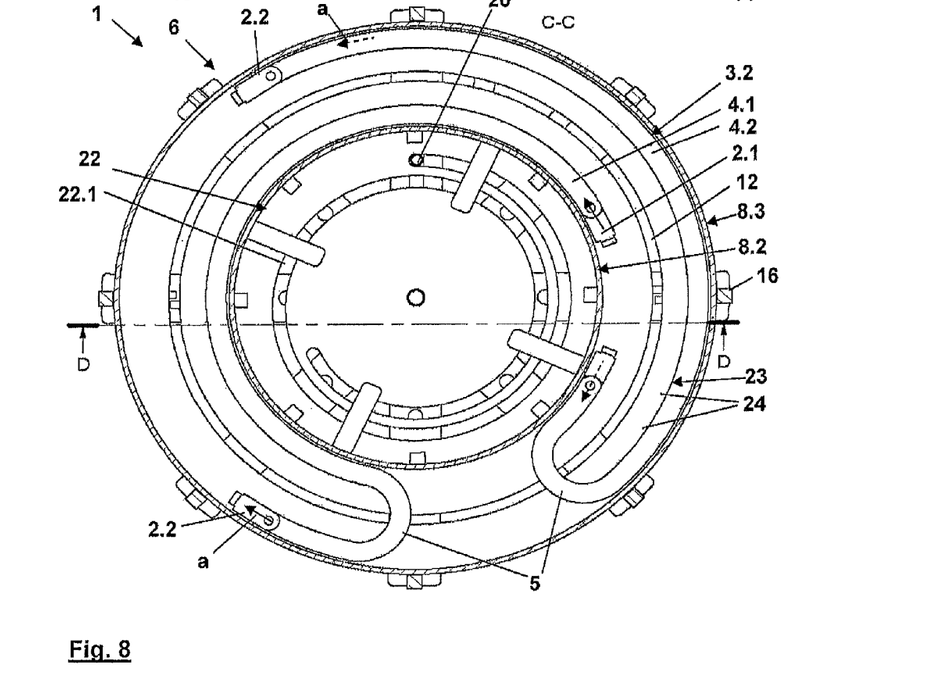
FIG. 8 shows a cross-sectional view along the section line C-C in FIG. 6.

Reference is now made to FIG. 5 showing an exploded view illustrating the structure in principle of the second embodiment of the line guide system 1. From below upwardly, at the bottom the base B is arranged with the rolling bearings 15.1, 15.2 for the central guide unit 8.2, wherein the front guide unit 8.1 is fitted with the brackets 16 on the base B. The brackets 16 in turn carry in relation to the second plane E.2 rolling bearings 15.1, 15.2 for the further upwardly arranged rear guide unit 8.3 and a plain bearing 15.3 for the central guide unit in the second plane E.

The central guide unit 8.2 is divided into two halves which are almost of the same structure, a lower half 17.1 and an upper half 17.2 which can be fitted together by way of a push-in connection 18. In that way the rear guide unit 8.3 is mounted rotatably on the front guide unit 8.1 while the central guide unit 8.2 is mounted with its lower half 17.1 rotatably on the base B and with its upper half 17.2 slidingly displaceably on the front guide unit 8.1. By virtue of the arrangement of the guide channels 7.1, 7.2 in approximately mutually aligned relationship in two planes E.1, E.2 the first guide channel 7.1 is covered by means of the rear guide unit 8.3 and the here upper half 17.2 of the central guide unit 8.2. To cover over the second guide channel 7.2 there is provided a cover element 19 which in turn is provided with peripherally equally spaced brackets 16 for support in respect of the structure (not shown here), the brackets 16 being connected to the rear guide unit 8.3 by way of a push-in connection 18.

This exploded view in FIG. 5 makes it clear how simple the structure of the line guide system 1 is, insofar as here individual prefabricated components can be fitted into each other in a modular construction. Thus, generally and also in relation to this embodiment, such a module system is also suitable for embodiments of the line guide system, which have more and many storeys. Similarly as in FIG. 2, this enlargement of the line guide system 1 is also indicated here by broken lines which are intended to symbolise continuation of this line guide system 1 into a third plane E.3. Implementing the logic of the structural principle, the rear guide unit in this embodiment of the line guide system extends into the third plane E3, although this is not explicitly shown here, and with a further fourth guide unit which is also not shown here constitutes a third guide channel 7.3 in which two third strands 3.3 are displaced here.

To delimit the rotary angle range between the front guide unit 8.1 and the central guide unit 8.2 relative to each other there is provided here an axial projection 20 which is radially displaceably mounted in a radial slot 21 provided on the base B, and engages with its end into a sliding guide 23 fixedly connected to the here lower half 17.1 of the central guide unit 8.2, with a spiral-shaped slot 22.1, wherein the projection 20 at the end of the prescribed rotary angle range between the two guide units 8.1, 8.2 butts at the end in the spiral slot 22.1. As can be directly seen from the shape of the spiral slot 22.1 the rotary angle range is here about 600°. Delimitation of the rotary angle range between the central guide unit 8.2 and the rear guide unit 8.3 is here also provided by way of an electronic control which is not further shown here.

The third embodiment of the line guide system 1 of FIGS. 10 to 13 differs from the above-described embodiment of the line guide system 1 of FIGS. 4 to 9 in that here a respective spacer body 23 is additionally arranged between the runs 4.1, 4.2 of the first strands 3.1 and between the runs 4.1, 4.2 of the second strands 3.2, to space the runs 4.1, 4.2 and to provide for the prescribed configuration of the respectively associated deflection arc 5. The provision of such spacer bodies 23 is appropriate in particular when the structural sizes of the line guide system 1 reach larger dimensions while they are not absolutely required in the case of small line guide systems. As FIG. 11 for example shows, the spacer bodies 23 involve an opened circular ring shape and are of a chain-like structure with individual ring portions 24 as chain link members. Those ring portions 24 are here connected together at their ends by way of a push-in connection 18. The ring portions 24 can be successively introduced into their respectively provided guide channel 7.1, 7.2 and connected at the ends by way of the push-in connection 18, to constitute the spacer body 23. As can be seen from FIGS. 13 and 14, each being a cross-sectional view, the spacer body 23 is arranged with play between the runs 4.1, 4.2 and the deflection arc 5 to produce here as little friction as possible between the spacer body 23 and the respective strands 3.1, 3.2 and the deflection arcs 5 respectively.

The spacer bodies 23 are respectively arranged guided in the guide channel 7.1, 7.2. For that purpose the ring portions 24 at the underside respectively have a guide projection 25 which is like a circular arc and which engages into the annular gap 12 between the guide units 7.1, 7.2, 7.3.

FIGS. 16 to 18 are intended to show by way of example how a line guide system 1 according to the invention can be integrated into a larger machine installation M with a base B and a superstructure A thereon. Of the machine installation M itself only a lower region is shown, which thus only represents a substructure for a further structure to be mounted thereon. As can be seen by virtue of a laterally flange-connected stairway T it is of relatively large dimensions. The machine installation M can be a sub-structure for example a floating crane.

The fourth embodiment of the line guide system 1 here is arranged between the base B and the structure A, wherein, to better illustrate the line guide system 1, the structure A is lifted relative to the line guide system 1. It is possible to clearly see the brackets 16 on which the structure A rests in the installation position and which are thus part of a provided connection device S for installation or connection of the line guide system 1 in or on the machine structure (M).

FIG. 17 shows a cross-section along section line H-H in FIG. 16 with a plan view on to the line guide system 1. Also shown is a section line I-I which is passed through one of the brackets 16 and reproduced in FIG. 18. FIG. 18 clearly shows the structure in principle of an embodiment of the line guide system 1, which is fitted in the machine installation M. In this case also there are two guide channels 7.1, 7.2 in a respective plane E.1, E.2, wherein the first strands 3.1 can be displaced in the first guide channel 7.1 and the second strands 3.2 can be displaced in the second guide channel 7.2. Thus the fourth embodiment of the line guide system 1 is similar to the second embodiment of the line guide system 1 shown in FIGS. 4 to 9, from the point of view of the structure in principle. In the fourth embodiment of the line guide system 1 however the strands 3.1, 3.2 are of substantially larger cross-sections, wherein they are of an elongate shape and the strands 3.1, 3.2 are so fitted into the guide channels 7.1, 7.2 that, advantageously in regard to the frictional forces occurring, the strands 3.1, 3.2 respectively bear with their shorter side against the radial contact surfaces 9.1 of the respective guide unit 8.1, 8.2, 8.3 so that frictional forces occurring upon displacement between deflection arcs of the first strands 3.1 and the second strands 3.3 can be minimised. Here the strands 3.1, 3.2 are respectively in the form of a line guide chain 26 with chain link members 27 arranged in the line guide system 1 pivotably parallel to the rotary axis d.

It is possible to see from this longitudinal section the structure of the brackets 16 which are arranged one above the other in order thereby to transmit to the base B the pressure forces exerted by the structure A. A radially inward connection flange F is also provided as part of the connection device S, for fitment to the machine installation M.

List of Reference Numerals

1 line guide system
2.1 front connection point
2.2 rear connection point
3.1 first strand
3.2 second strand
3.3 third strand
4.1 first run
4.2 second run
5 deflection arc
6 guide system
7.1 first guide channel
7.2 second guide channel 7.3 third guide channel
7.4 fourth guide channel
8.1 front guide unit
8.2 central guide unit
8.3 rear guide unit
9.1 radial contact surface
9.2 peripheral contact surface
10 stem bar
11 transverse bar
12 annular gap
13 abutment
14 circular rail
15.1 axial rolling bearing
15.2 radial rolling bearing
15.3 plain bearing
16 brackets
17.1 lower half
17.2 upper half
18 push-in connection
19 cover element
20 projection
21 slot
22 sliding guide element
22.1 slot
23 spacer body
24 ring portion
25 guide projection
26 line guide chain
27 chain link member
a succession direction
d rotary axis
A structure
B base
E.1 first plane
E.2 second plane
E.3 third plane
F connection flange
M machine installation
S connection device
T stairway

What is claimed is:

1. A line guide system to receive and guide supply lines between two connection points, wherein the two connection points are movable relative to each other in a circular movement with respect to a rotary axis over a rotary angle range,
wherein the line guide system has an elongate strand which is coupled to the connection points and at or in which the supply lines are arrangeable in guided relationship, and the strand is reciprocatingly displaceable guidedly over a circular arc within the rotary angle range, forming a first run, a second run and a deflection arc connecting the first and second runs together,
wherein at least two strands comprising a first strand and a second strand are arranged coupled one behind the other, and a guide system to guide the strands, the guide system having three guide units which are rotationally movable relative to each other with respect to the rotary axis, with respect to the direction of succession a front guide unit, a central guide unit and a rear guide unit,
wherein the guide units are arranged in two axially spaced planes, a first plane and a second plane, perpendicularly to the rotary axis,
wherein the first strand is fixed to the front and central guide units, and
wherein the second strands is fixed to the central and rear guide units.

2. The line guide system according to claim 1 wherein the at least two strands are arranged spaced relative to each other axially or radially with respect to the rotary axis.

3. The line guide system according to claim 1 wherein there are provided a plurality of strands which are coupled one behind the other and are arranged spaced relative to each other axially or radially with respect to the rotary axis.

4. The line guide system according to claim 1 wherein the connection points of the strands are in the form of a front connection point and a rear connection point with respect to a direction of succession from the first strand towards the second strand, wherein the rear connection point of the first strand is arranged stationarily relative to the front connection point of the second strand.

5. The line guide system according to claim 4 wherein the front connection point of the first strand is fixed to the front guide unit, the rear connection point of the first strand and the front connection point of the second strand is fixed to the central guide unit and the rear connection point of the second strand is fixed to the rear guide unit.

6. The line guide system according to claim 4 wherein the front guide unit is arranged in the first plane and the rear guide unit is arranged in the second plane and the central guide unit is arranged in bridging relationship of the axial spacing of the planes in both planes in such a way that the rear connection point of the first strand in the first plane and the front connection point of the second strand in the second plane is fixed to the central guide unit.

7. The line guide system according to claim 1 wherein the front guide unit is arranged stationarily on a base.

8. The line guide system according to claim 7 wherein the front guide unit is fixed on the base and the central guide unit and the rear guide unit are mounted rotationally movably on the base.

9. The line guide system according to claim 7 wherein the front guide unit is fixed on the base and the central guide unit is rotationally movably mounted on the base and the rear guide unit is rotationally movably mounted on the front guide unit.

10. The line guide system according to claim 1 wherein the guide units for each run associated with them, for guidance thereof on circular arcs, have respective circular ring-like contact surfaces, a peripheral contact surface and a radial contact surface.

11. The line guide system according to claim 10 wherein the contact surfaces provided for the two runs of a strand are arranged spaced relative to each other coaxially and radially relative to the rotary axis, wherein the deflection arc bridges over the radial spacing of the contact surfaces from the one guide unit for the first run of said strand to the guide unit for the second run of said strand.

12. The line guide system according to claim 11 wherein the contact surfaces provided for the two runs of a strand delimit a guide channel for said strand.

13. The line guide system according to claim 12 wherein the connection point of a run is respectively fixed to the radial contact surface associated with said run.

14. The line guide system according to claim 1 wherein the rotary angle ranges of the strands are abutment-limited and/or drive-limited.

15. The line guide system according to claim 1 wherein provided at least for one strand is a spacer body for spacing its runs, which spacer body is arranged between the runs and on the inside of the deflection arc and is coupled to the displacement of said strand.

16. The line guide system according to claim 15 wherein the spacer body is in the form of a chain with chain link members which are arranged guided in the line guide system pivotably relative to each other in parallel relationship with the rotary axis.

17. The line guide system according to claim 1 wherein there are provided two first strands and/or two second strands, wherein the first strands and the second strands are respectively arranged in a plane and displaceably in opposite relationship therein relative to each other.

18. The line guide system according to claim 17 wherein provided for the first strands and/or the second strands is a respective spacer body which in part-peripheral relationship is arranged between the runs of the first strands and the second strands respectively and at the end on the inside bearing with play against the deflection arcs of the first strands and the second strands respectively.

19. The line guide system according to claim 1 wherein the strands are respectively in the form of a line guide chain with chain link members which in the position of installation in the line guide system are arranged pivotably relative to each other in parallel relationship with the rotary axis.

20. The line guide system according to claim 1 wherein the line guide system is installed or connected to a machine structure through a connection device.

\* \* \* \* \*